March 27, 1928.  1,663,970
J. BRENZINGER
MEANS FOR THE ELECTRIC WELDING OF CAN BODIES
Filed July 1, 1925  4 Sheets-Sheet 2
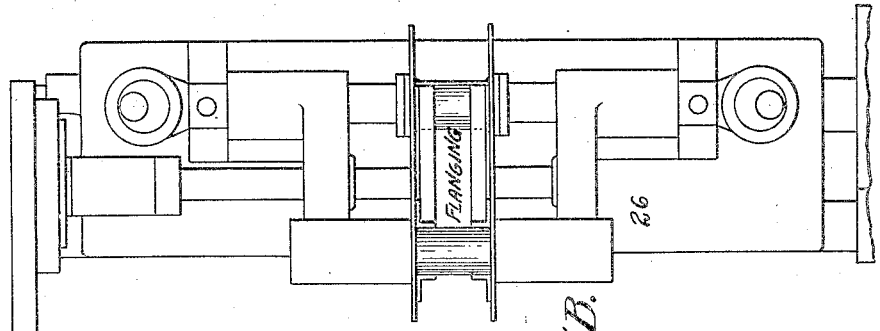
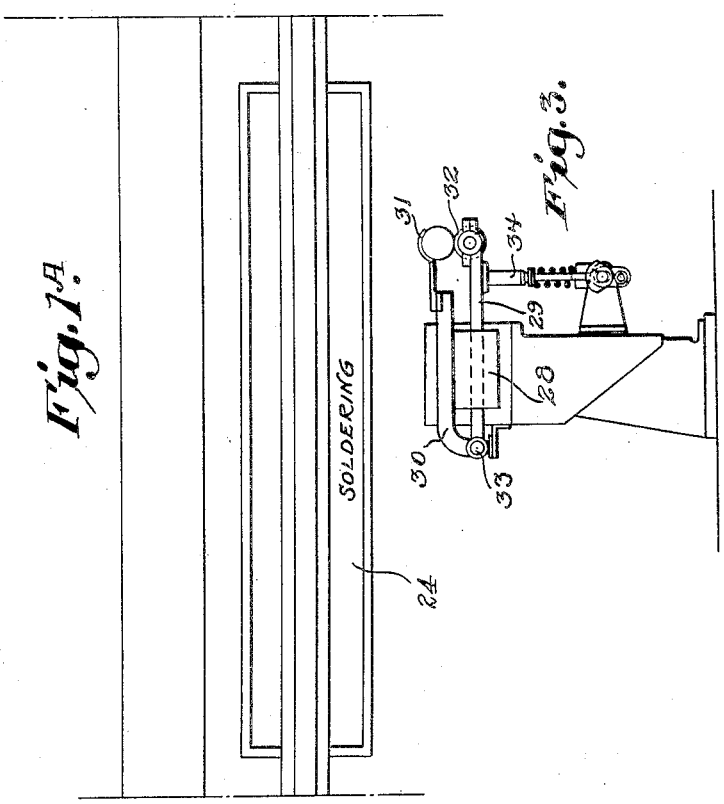
INVENTOR
Julius Brenzinger
BY
ATTORNEY

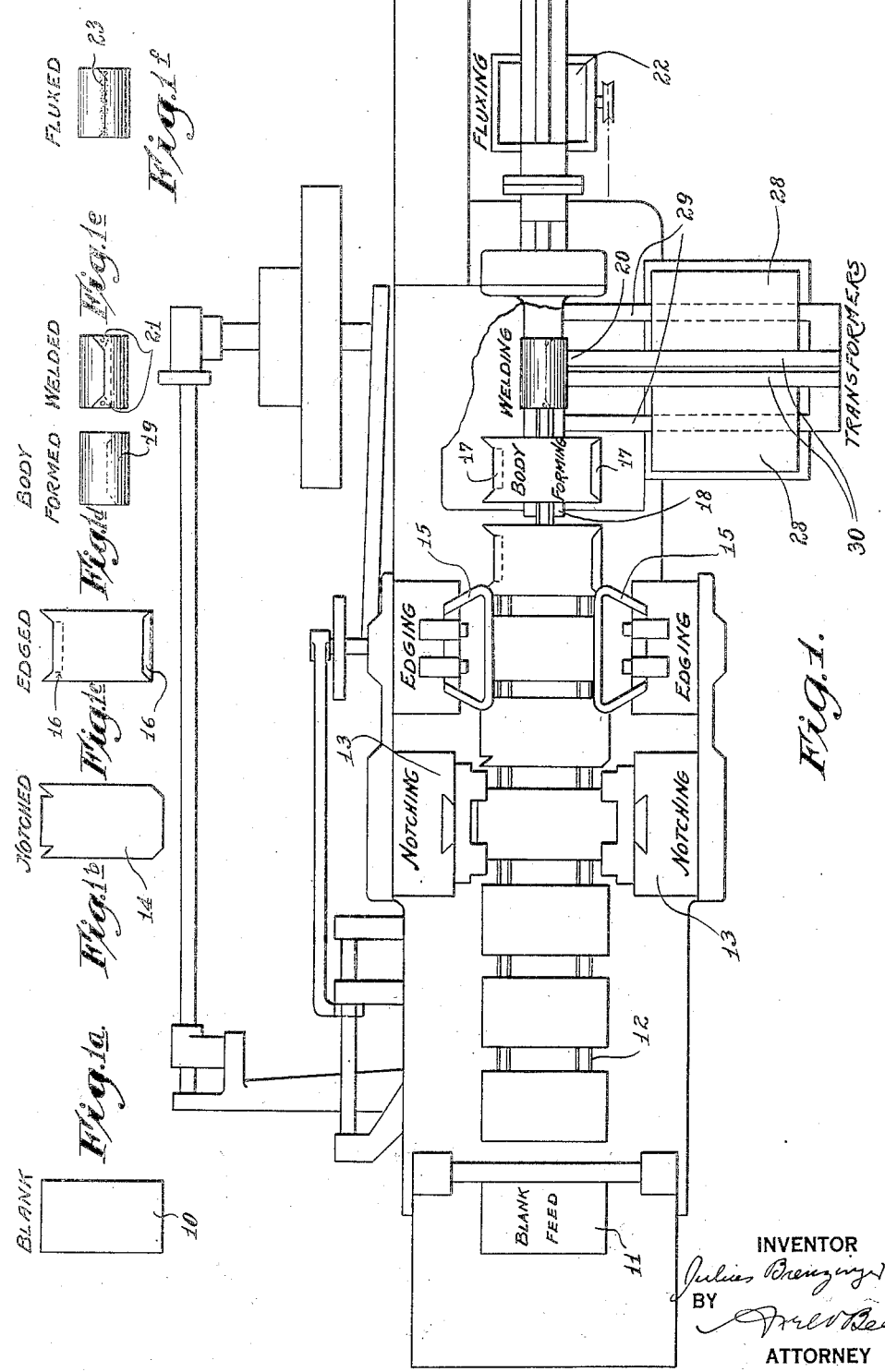

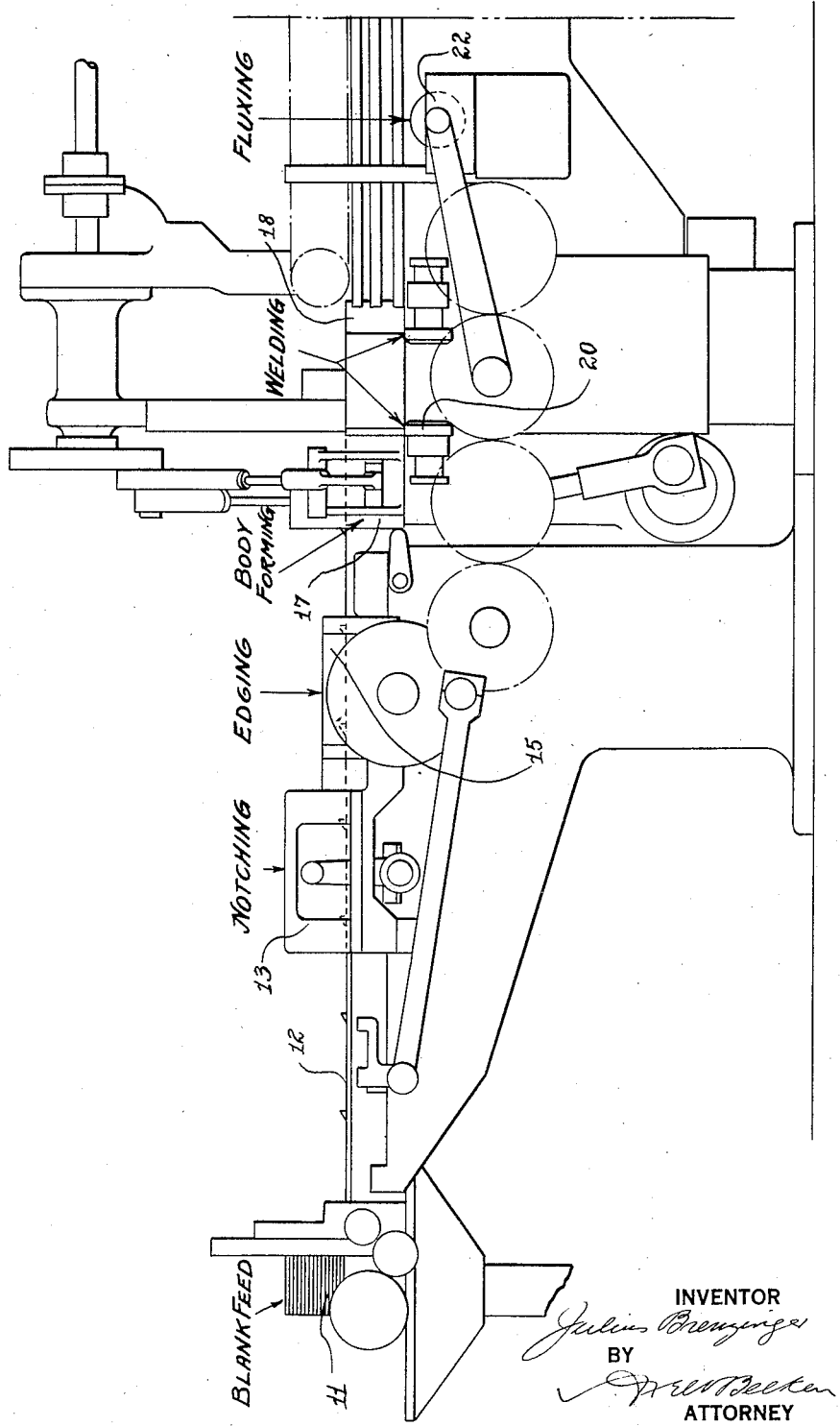

March 27, 1928.
J. BRENZINGER
1,663,970
MEANS FOR THE ELECTRIC WELDING OF CAN BODIES
Filed July 1, 1925    4 Sheets-Sheet 4
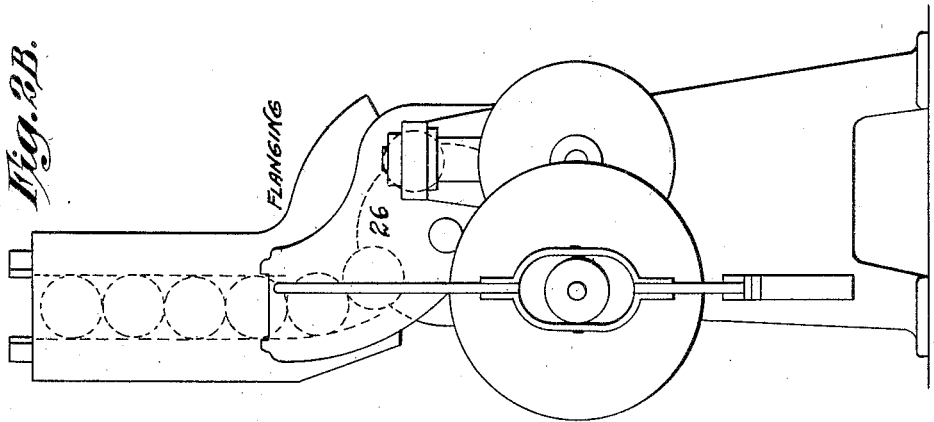
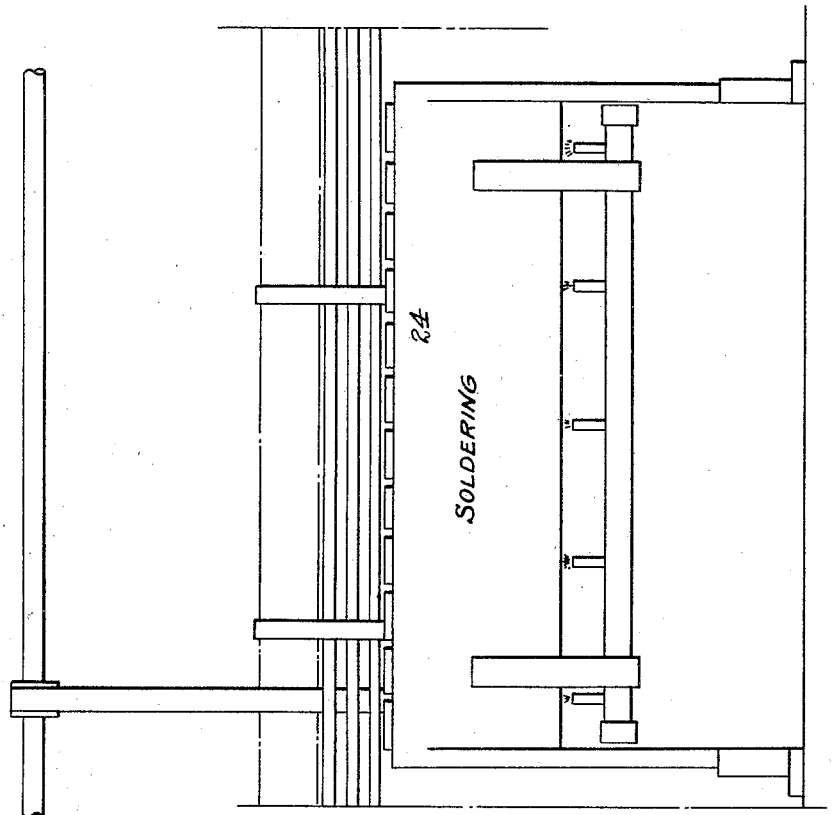
INVENTOR
Julius Brenzinger
BY
ATTORNEY Patented Mar. 27, 1928.

1,663,970

UNITED STATES PATENT OFFICE.

JULIUS BRENZINGER, OF FAIRFIELD, CONNECTICUT, ASSIGNOR TO THE MAX AMS MACHINE COMPANY, OF BRIDGEPORT, CONNECTICUT, A CORPORATION OF NEW YORK.

MEANS FOR THE ELECTRIC WELDING OF CAN BODIES.

Application filed July 1, 1925. Serial No. 40,731.

This invention relates to an electric welding device for welding the overlapping parts of a can body adjacent the side seam thereof, and is more particularly adapted to provide means to practice the process and to obtain the product of Patent No. 1,542,662, of June 16, 1925.

The main object and feature of the invention is to provide automatic means for carrying out the invention of the aforesaid patent.

In the accompanying drawings the invention is disclosed in a concrete and preferred form in which:

Fig. 1 is a plan view, largely diagrammatic, of one end of a body-forming machine embodying my invention.

Fig. 1$^A$ is a plan view, largely diagrammatic, of the other end of a body-forming machine embodying the invention.

Fig. 1$^B$ is a plan view, largely diagrammatic, of a flanging machine for flanging the ends of can bodies and which may be associated with the body-forming machine.

Fig. 2 is a side elevation, largely diagrammatic, of Fig. 1.

Fig. 2$^A$ is a side elevation, largely diagrammatic, of Fig. 1$^A$.

Fig. 2$^B$ is a side elevation, largely diagrammatic, of Fig. 1$^B$.

Fig. 3 is a detail view of the welding means.

Figs. 1$^a$, 1$^b$, 1$^c$, 1$^d$, 1$^e$, 1$^f$, 1$^g$ and 1$^h$ are diagrammatic views illustrating the steps of the process.

Blanks of sheet material, like 10 of Fig. 1$^a$, are fed from a suitable source of supply 11 and are carried forward, preferably intermittently, by a conveyor, 12, of the character usually provided in machines of this kind; and these blanks are first acted upon by notching device 13 that shapes each blank as indicated at 14 in Fig. 1$^b$. 15 indicates an edging device that turns over the edges 16, as shown in Fig. 1$^c$. 17 indicate body-forming members that fold the blank around a horn or support 18 into a body 19 shown in Fig. 1$^d$ with the edged portions of the blank interlocked and portions 14 overlapping at the ends of the body. Adjacent the horn, or an extension thereof, is an electric welding device generally indicated by 20 that welds, at 21 shown in Fig. 1$^e$, the overlapping portions 14. The body is now carried to the fluxing device 22 and flux applied, as indicated at 23 in Fig. 1$^f$, after which the body is passed over soldering device 24 and a line of solder is applied as indicated at 25 in Fig. 1$^g$. The body may now be removed and placed in the flanging device 26 that acts to flange it as indicated in Fig. 1$^h$ at 27. Sometimes, the body is soldered and not flanged and, at other times, it is merely flanged and not soldered.

The various instrumentalities making up the machine, with the exception of the welding means, are all well-known and need not be described in detail. The welding means are, in the present instance, constructed as follows: adjacent the horn or support for the interior of the body, and over which it slides, is a transformer, the primary of which is composed of two coils 28, and the secondary of which comprises two terminal welding members 29, extending through coils 28 to engage one side of the exterior of the body on the support, and a third terminal welding member 30 connected to the other two and extending outside of the coils to engage the other side of the exterior of the body on the support. Member 30 terminates in a curved contact plate 31, when the body is round, to engage the body and between which and the horn the body slides. Members 29 carry, at their outer ends, rollers 32 so located as to engage the body at the point where the electric welds are desired. Preferably, there is a pivot connection at 33 between members 29 and 30 so that members 29 may be moved toward and away from the body on the support; and, to this end, a rod, as 34, actuated by a suitable cam or otherwise, is provided. The construction may be such that the coils are fast on members 29 and may be moved up and down therewith.

After the body has been formed by the body-forming members, it is advanced beneath member 30, and in contact therewith, and members 29 now move upward into engagement with the body thereby welding the overlapping portions thereof. Members 29 then descend and the body is advanced to the next station and a new body comes into position to be welded.

I claim:

1. An electric welding device including: a support for the interior of a can body, and a transformer consisting of a primary composed of two coils and a secondary comprising two members extending through the coils to engage one side of the exterior of the body on the support and a third member connected to the other two and extending outside of the coils to engage the other side of the exterior of the body on the support.

2. An electric welding device including: a support for the interior of a can body, a transformer consisting of a primary composed of two coils and a secondary comprising two members extending through the coils to engage one side of the exterior of the body on the support and a third member connected to the other two and extending outside of the coils to engage the other side of the exterior of the body on the support, and means for moving the two members toward and away from the body.

Signed at Bridgeport in the county of Fairfield and State of Connecticut this 23rd day of June, 1925.

JULIUS BRENZINGER.